(12) United States Patent
Terrazas-Moreno et al.

(10) Patent No.: US 11,995,127 B2
(45) Date of Patent: May 28, 2024

(54) VALIDATION OF OPERATING PLANS AND SCHEDULES USING MACHINE LEARNING

(71) Applicant: AspenTech Corporation, Bedford, MA (US)

(72) Inventors: Sebastian Terrazas-Moreno, Houston, TX (US); Dimitrios Varvarezos, Houston, TX (US); Stacy Janak, Katy, TX (US)

(73) Assignee: ASPENTECH CORPORATION, Bedford, MA (US)

( * ) Notice: Subject to any disclaimer, the term of this patent is extended or adjusted under 35 U.S.C. 154(b) by 549 days.

(21) Appl. No.: 16/406,559

(22) Filed: May 8, 2019

(65) Prior Publication Data

US 2020/0320131 A1 Oct. 8, 2020

Related U.S. Application Data

(63) Continuation-in-part of application No. 16/372,970, filed on Apr. 2, 2019, now Pat. No. 11,321,376.

(51) Int. Cl.
*G06F 16/9035* (2019.01)
*G06F 16/906* (2019.01)

(52) U.S. Cl.
CPC ........ *G06F 16/9035* (2019.01); *G06F 16/906* (2019.01)

(58) Field of Classification Search
CPC .. G06F 16/353; G06F 16/355; G06F 16/9035; G06F 16/906
See application file for complete search history.

(56) References Cited

U.S. PATENT DOCUMENTS

| 7,949,624 B2 | 5/2011 | Kelly et al. |
|---|---|---|
| 8,046,318 B2 | 10/2011 | Stuluka |
| 11,321,376 B2 | 5/2022 | Terrazas-Moreno et al. |

(Continued)

FOREIGN PATENT DOCUMENTS

| EP | 3166057 A1 | 5/2017 | |
|---|---|---|---|
| WO | WO-0033218 | * 6/2000 | ............. G06F 17/50 |

(Continued)

OTHER PUBLICATIONS

Xu, R. & Wunsch, D., Survey of Clustering Algorithms, IEEE Transactions on Neural Networks 16 (May), pp. 645-678, 2005.

(Continued)

*Primary Examiner* — Amanda L Willis
(74) *Attorney, Agent, or Firm* — Hamilton, Brook, Smith & Reynolds, P.C.

(57) ABSTRACT

Disclosed are methods and systems that help identify critical variables for more efficient and robust plan validation process. An example embodiment is a computer implemented method of industrial process control. The example method includes receiving in computer memory a dataset including initial process parameters representing operational data of a subject industrial process, and, using filtering operations and grouping operations on the dataset, identifying a subset of the process parameters indicative of control data for controlling the subject industrial process. The example method further includes automatically applying the identified subset of process parameters controlling the subject industrial process.

18 Claims, 6 Drawing Sheets

(56) References Cited

U.S. PATENT DOCUMENTS

| | | | | |
|---|---|---|---|---|
| 2003/0229456 | A1* | 12/2003 | Beger | G16C 20/30 |
| | | | | 702/27 |
| 2007/0046696 | A1* | 3/2007 | Zheng | G06V 10/772 |
| | | | | 345/646 |
| 2011/0145238 | A1 | 6/2011 | Stork | |
| 2012/0156099 | A1* | 6/2012 | Zhong | B82Y 15/00 |
| | | | | 422/82.02 |
| 2013/0185033 | A1* | 7/2013 | Tompkins | G06F 30/20 |
| | | | | 703/2 |
| 2014/0066328 | A1* | 3/2014 | Modlin | C12Q 1/6886 |
| | | | | 506/18 |
| 2014/0344007 | A1 | 11/2014 | Shende et al. | |
| 2017/0365155 | A1* | 12/2017 | Borutta | G06N 20/00 |
| 2018/0137219 | A1 | 5/2018 | Goldfarb | |
| 2018/0247195 | A1* | 8/2018 | Kumar | G16B 40/10 |
| 2018/0300637 | A1 | 10/2018 | Wang | |
| 2019/0166024 | A1 | 5/2019 | Ho et al. | |
| 2020/0320338 | A1 | 10/2020 | Terrazas-Moreno et al. | |

FOREIGN PATENT DOCUMENTS

| | | | |
|---|---|---|---|
| WO | 2020205149 | A1 | 10/2020 |
| WO | 2020205150 | A1 | 10/2020 |

OTHER PUBLICATIONS

Pedregosa, F. et al., Machine Learning in Python, Journal of Machine Learning Research 12 (Oct), pp. 2825-2830, 2011.

Murtagh, F. et al., Ward's Hierarchical Agglomerative Clustering Method: Which Algorithms Implement Ward's Criterion?, Journal of Classification 31, pp. 274-295, 2014.

Kubinyi, H., 3D-QSAR in Drug Design, Theory, Methods, and Applications (pp. 523-550), Ledien: ESCOM Science (1993).

"Notification of Transmittal of The International Search Report and The Written Opinion of the International Searching Authority, or the Declaration," issued for International Application No. PCT/US2020/021106, entitled "Classification of Operating Plan Data Using Machine Learning," dated Apr. 24, 2020.

Wold H. Estimation of principal components and related models by iterative least squares. In Multivariate Analysis, Krishnaiah P (ed.). Academic Press: New York, 1966; 391-420.

Wold, S., Ruhe, A., Wold, H., & Dunn, W. (1984). The collinearity problem in linear regression. The partial least squares (PLS) approach to generalized inverses. Society for Industrial and Applied Mathematics, vol. 5; 735-743.

Rui Xu and Donald C. Wunsch, "Survey of Clustering Algorithms", IEEE Transactions on Neural Networks 16 (May):645-678, 2005.

Jackson, J. (1991). A User's Guide to Principal Components. New York: John Wiley.

Notification of Transmittal of the International Search Report and the Written Opinion of the International Searching Authority, or the Declaration, "Validation Of Operating Plans And Schedules Using Machine Learning," PCT/US2020/021114, dated Jun. 15, 2020.

International Preliminary Report on Patentability received for PCT Patent Application No. PCT/US2020/021106, dated Oct. 14, 2021, 8 pages.

International Preliminary Report on Patentability received for PCT Patent Application No. PCT/US2020/021114, dated Oct. 14, 2021, 9 pages.

* cited by examiner

| | Solution ID | CaseID | PeriodID | NodeID | SequenceID | Status | Activity | Cost | LoBound | HBound | Marginal Value |
|---|---|---|---|---|---|---|---|---|---|---|---|
| 1 | 498231223 | 1781 | 0 | 1 | 1645 | BS | 85.1052322387695 | 0 | 0 | 200 | 0 |
| 2 | 498231223 | 1781 | 0 | 1 | 1646 | BS | 0 | 0 | 0 | NULL | 0 |
| 3 | 498231223 | 1781 | 0 | 1 | 1647 | BS | 29.1249027252197 | 0 | 0 | NULL | 0 |
| 4 | 498231223 | 1781 | 0 | 1 | 1648 | BS | 0 | 0 | 0 | NULL | 0 |
| 5 | 498231223 | 1781 | 0 | 1 | 1649 | BS | 5 | 0 | 0 | NULL | 0 |
| 6 | 498231223 | 1781 | 0 | 1 | 1650 | BS | 15 | 0 | 0 | NULL | 0 |
| 7 | 498231223 | 1781 | 0 | 1 | 1651 | BS | 70.1052322387695 | 0 | 0 | NULL | 0 |
| 8 | 498231223 | 1781 | 0 | 1 | 1652 | BS | 34.1249046325684 | 0 | 0 | 100 | 0 |
| 9 | 498231223 | 1781 | 0 | 1 | 1653 | BS | 29.1249027252197 | 0 | 0 | NULL | 0 |
| 10 | 498231223 | 1781 | 0 | 1 | 1654 | BS | 5 | 0 | 0 | NULL | 0 |
| 11 | 498231223 | 1781 | 0 | 1 | 1655 | BS | 1.23617029190063 | 0 | 0 | 50 | 0 |
| 12 | 498231223 | 1781 | 0 | 1 | 1656 | BS | 5.39969730377197 | 0 | 0 | NULL | 0 |
| 13 | 498231223 | 1781 | 0 | 1 | 1657 | LL | 0 | 0 | 0 | NULL | -5.90571498887085 |
| 14 | 498231223 | 1781 | 0 | 1 | 1658 | BS | 1.14626586437225 | 0 | 0 | NULL | 0 |
| 15 | 498231223 | 1781 | 0 | 1 | 1659 | BS | 0 | 0 | 0 | NULL | 0 |
| 16 | 498231223 | 1781 | 0 | 1 | 1660 | BS | 0 | 0 | 0 | NULL | 0 |
| 17 | 498231223 | 1781 | 0 | 1 | 1661 | BS | 0.0359075516462326 | 0 | 0 | 50 | 0 |
| 18 | 498231223 | 1781 | 0 | 1 | 1662 | BS | 0 | 0 | 0 | NULL | 0 |
| 19 | 498231223 | 1781 | 0 | 1 | 1663 | BS | 0 | 0 | 0 | NULL | 0 |

- dbo.PrMpsRange
- dbo.PrMpsRhs
- dbo.PrMpsRows
- dbo.PrMSSolutions
- dbo.PrNode
- dbo.PrOpenInventoryQuality
- dbo.PrParametricAnalysis
- dbo.PrParaObj
- dbo.PrParaResult
- dbo.PrPenalty
- dbo.PrPenaltyType
- dbo.PrPeriod
- dbo.PrPimsMsg
- dbo.PrPrimalColumn
- dbo.PrPrimalRow
- dbo.PrProcessCapacity
- dbo.PrProcessCapacityLimit
- dbo.PrProductRange
- dbo.PrPRow
- dbo.PrPumpCapacityLimit
- dbo.PrPurchase
- dbo.PrQuality
- dbo.PrQualityOrigin

FIG. 2

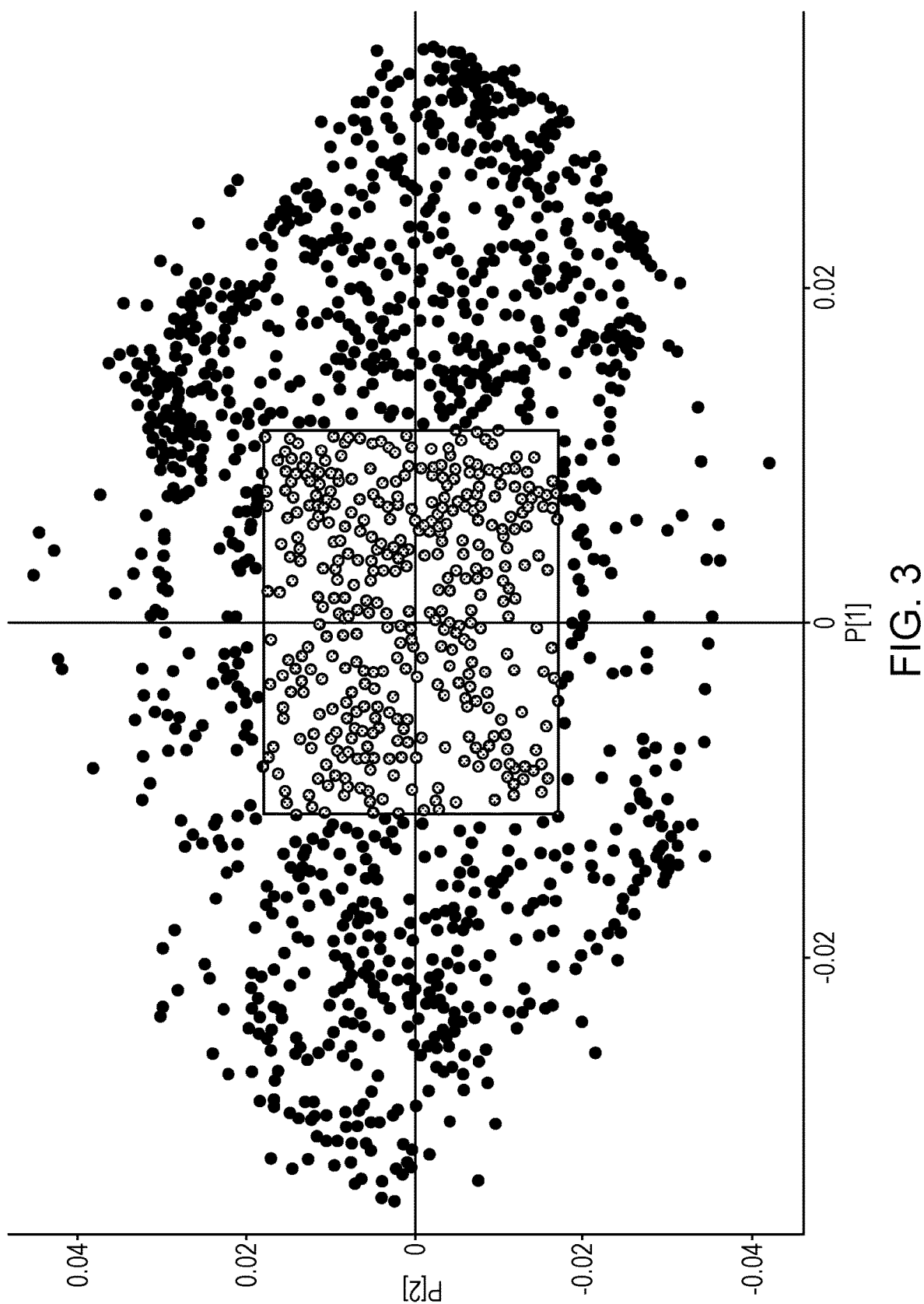

VALIDATION OF OPERATING PLANS AND SCHEDULES USING MACHINE LEARNING

RELATED APPLICATION(S)

This application is a continuation-in-part of U.S. application Ser. No. 16/372,970, filed Apr. 2, 2019. The entire teachings of the above application are incorporated herein by reference.

BACKGROUND

Operational planning in process industries involves the creation of operating plans that contain guidelines for operating the organization's facilities. In oil refineries and other chemical process facilities the plan is issued monthly and, in some cases, updated weekly. These plans dictate the profitability of the organization's operation, so they need to be thoroughly reviewed before they are issued. Furthermore, these plans form the starting point for an interactive loop that includes and drives all scheduling decisions required to make those plans actionable and operational. The review process requires expertise from several departments in the organization: Operations, Process Engineering, Maintenance, Scheduling, and Logistics, among others. Each of these organizations must review a section of the plan that consists of thousands of variables and draw on the experience of its members to detect anomalies or suggest improvements. Due to practical considerations that include time, experience, and availability constraints on the key stakeholders, the review of the plan (as well as the detailed schedule) ends up including only a few operational parameters that each of the organizations considers important.

SUMMARY

The process described above is costly for the organization because it requires several experienced resources frequently reviewing operating plans and schedules. This fact is aggravated by the gap in employee demographics in the process industries, where junior resources are having to take over the responsibilities of experienced planners and schedulers.

The resources involved in the planning process would benefit from a tool to help them select a relevant subset of process variables. The plan and schedule validation efforts would be focused on reviewing the selected process variables. This selection of variables can have the following example characteristics: (1) Capture most of the variability across past operating plans and schedules; (2) Contain variables that are easy to interpret from a business point of view; and (3) Include variables that are relevant for different groups in the organization. A tool or methodology that can help identify these variables can result in a more efficient and robust plan validation process that takes advantage of Machine Learning technology rather than experienced-based heuristics.

A model may have many process parameters (including but not limited to process variables or process constraints) that represent industrial processes. In some scenarios, the model may have numerous (for non-limiting example, 10,000) such parameters. An instance of a model is known as a "case." A case may include many parameters. As such, a user can create multiple cases of the model, and in each case the corresponding parameters may have different values, in order to model different scenarios, such as different seasons (winter, summer, spring, fall).

Existing approaches, such as "Classification of Operating Plan Data Using Machine Learning" (parent patent application, U.S. application Ser. No. 16/372,970, filed Apr. 2, 2019, incorporated herein by reference), classify cases. By contrast with existing case-base classification approaches, embodiments herein classify variables themselves, thereby providing classification at a much more granular level than case-based classification. Embodiments herein further improve upon existing approaches by reducing the variable space itself through filtering, grouping, and extraction.

The methods and systems disclosed herein leverage historical operating plan data to identify all process variables relevant for a specific operating site and use feature extraction technology to identify a vocabulary of critical process variables. Historical operating plan data can be extracted from the output of the organization's Operation's Planning software and/or Operation's Scheduling software.

The example methods and systems can provide feature extraction technology to identify a vocabulary of critical process variables for operating plan validation, including, for example: (1) Pruning of process variables based on their importance for describing statistically significant differences among operating plans in the historical data set; (2) Grouping of variables that are strongly correlated according to the historical operating plan and schedule data; and (3) Selection of variables from each of the established groups based on a combination of statistical criteria and/or a priority rating determined through domain knowledge.

The example methods and systems can also provide for validating a new operating plan and a detailed schedule by comparing such plan against historical data using only the vocabulary of critical process variables. The comparison involves the calculation of delta values between the process variables in the new operating plan and those in the historical data, where the sorting is based on the statistical significance of each delta value.

One example embodiment is a computer implemented method of industrial process control. The example method includes receiving in computer memory a dataset including initial process parameters representing operational data of a subject industrial process, and, using filtering operations and grouping operations on the dataset, identifying a subset of the process parameters indicative of control data for controlling the subject industrial process. Using filtering operations and grouping operations includes (i) applying a filter to the dataset that filters as a function of relative importance among the process parameters and that results in a filtered dataset having process parameters of threshold importance, (ii) grouping into one or more clusters the process parameters of the filtered dataset based on correlation among the process parameters of the filtered dataset, and (iii) for each cluster resulting from the grouping, extracting from the filtered dataset process parameters based on any one or combination of (a) a priority rating, (b) a measure of collinearity between the grouped process parameters within each given cluster of the determined clusters, (c) a measure of importance associated with the grouped process parameters, and (d) randomly or pseudo-randomly. The example method further includes automatically applying the identified subset of process parameters controlling the subject industrial process. Applying the filter to the dataset may filter as a function of relative importance among the process parameters in describing variability of the received dataset.

Another example embodiment is a computer system for industrial process control. The example system includes a data storage system and processor. The processor is operatively coupled to the data storage system and is configured to receive in computer memory a dataset including initial process parameters representing operational data of a subject industrial process, and identify, using filtering operations and grouping operations on the dataset, a subset of the process parameters indicative of control data for controlling the subject industrial process. Filtering operations and grouping operations includes (i) applying a filter to the dataset that filters as a function of relative importance among the process parameters and that results in a filtered dataset having process parameters of threshold importance, (ii) grouping into one or more clusters the process parameters of the filtered dataset based on correlation among the process parameters of the filtered dataset, and (iii) for each cluster resulting from the grouping, extracting from the filtered dataset process parameters based on any one or combination of (a) a priority rating, (b) a measure of collinearity between the grouped process parameters within each given cluster of the determined clusters, (c) a measure of importance associated with the grouped process parameters, and (d) randomly or pseudo-randomly. The processor is further configured to automatically apply the identified subset of process parameters controlling the subject industrial process. Applying the filter to the dataset may filter as a function of relative importance among the process parameters in describing variability of the received dataset.

Another example embodiment is a non-transitory computer-readable data storage medium comprising instructions causing a computer to receive in computer memory a dataset including initial process parameters representing operational data of a subject industrial process, and identify, using filtering operations and grouping operations on the dataset, a subset of the process parameters indicative of control data for controlling the subject industrial process. Filtering operations and grouping operations include (i) applying a filter to the dataset that filters as a function of relative importance among the process parameters and that results in a filtered dataset having process parameters of threshold importance, (ii) grouping into one or more clusters the process parameters of the filtered dataset based on correlation among the process parameters of the filtered dataset, and (iii) for each cluster resulting from the grouping, extracting from the filtered dataset process parameters based on any one or combination of (a) a priority rating, (b) a measure of collinearity between the grouped process parameters within each given cluster of the determined clusters, (c) a measure of importance associated with the grouped process parameters, and (d) randomly or pseudo-randomly. The instructions further cause the computer to automatically apply the identified subset of process parameters controlling the subject industrial process. Applying the filter to the dataset may filter as a function of relative importance among the process parameters in describing variability of the received dataset.

The industrial process can include at least one of an optimized operational planning process, a scheduling process, a simulated chemical plant process, and an actual chemical plant process. The operational data can include at least one of operating plan data and scheduling data. The process parameters can include at least one of a primal variable and a dual variable. The process parameters can include at least one of a process variable and a process constraint.

The methods and systems can further construct a principal component analysis (PCA) model that reduces dimensionality of the operational data of the dataset.

In some embodiments, extracting the process parameters can be based proportionally on at least one of (a) relative hyper-volumes of the grouped clusters, (b) relative numbers of the grouped process parameters of the grouped clusters, and (c) a uniform distribution between a plurality of the grouped clusters.

In some embodiments, applying a filter to the dataset includes filtering the dataset based on a hypervolume constructed around an origin of a projected space associated with the dataset.

Embodiments can include at least one of the following: (1) the priority rating is based on information indicative of subject matter expertise, the information comprising at least one of (a) metadata and (b) embedded information; (2) the priority rating is determined based on domain knowledge; (3) the measure of correlation is a measure of linear correlation of the remaining process parameters within the projected space; and (4) the measure of linear correlation increases as proximity between the remaining process parameters increases, and the measure of collinearity decreases as the grouped process parameters approach one or more edges of the cluster.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 2 illustrates example types of information that can be part of operating plan historical data.

FIG. 3 illustrates a two-dimensional view of an example loadings matrix.

DETAILED DESCRIPTION

A description of example embodiments follows.

Figure 1:
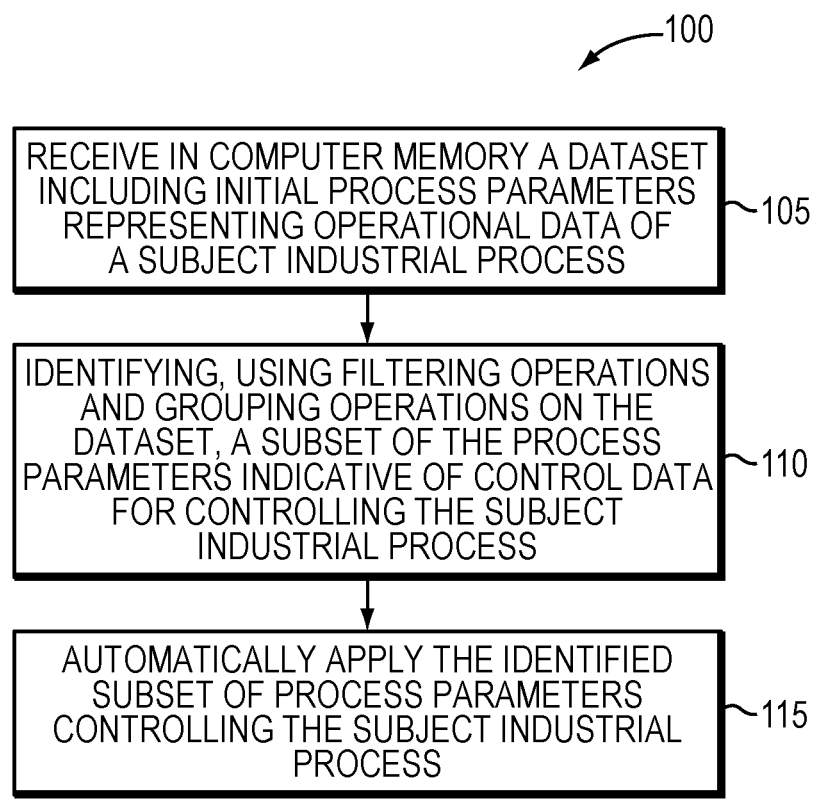
FIG. 1 illustrates a flow chart of an example method for industrial process control, according to an example embodiment.

FIG. 1 illustrates a computer implemented method 100 of industrial process control. The example method 100 includes receiving 105 in computer memory a dataset including initial process parameters representing operational data of a subject industrial process, and identifying 110, using filtering operations and grouping operations on the dataset, a subset of the process parameters indicative of control data for controlling the subject industrial process. Using filtering operations and grouping operations includes (i) applying a filter to the dataset that filters as a function of relative importance among the process parameters and that results in a filtered dataset having process parameters of threshold importance, (ii) grouping into one or more clusters the process parameters of the filtered dataset based on correlation among the process parameters of the filtered dataset, and (iii) for each cluster resulting from the grouping, extracting from the filtered dataset process parameters based on any one or combination of (a) a priority rating, (b) a measure of collinearity between the grouped process parameters within each given cluster of the determined clusters, (c) a measure of importance associated with the grouped process parameters, and (d) randomly or pseudo-randomly. The example method 100 further includes automatically applying 115 the identified subset of process parameters controlling the subject industrial process.

A. Operating Plan Historical Data Collection

Past operating plans are obtained from Operation's Planning or Scheduling software (for example: AspenTech's Production Information Management System (PIMS)) in the form of spreadsheets, databases or any other files that contain the primal and dual information of the optimal solution to each case. An example of a database application including the type of information that could be part of the Operating Plan Historical Data is shown in FIG. 2. Table 1 shows a portion of an Excel file with an example of the types of information of interest for a Historical Operating Plan instance. Note that FIG. 2 and Table 1 do not represent the only data formats or data contents relevant to the methods and systems disclosed herein; they are illustrative examples of the types of data that might describe an Operating Plan.

TABLE 1

| Constraint | ACTIVITY | SLACK | LO RHS | HI RHS | PI VALUE |
|---|---|---|---|---|---|
| OBJFN | 1000000.0000 | −1000000.0000 | | | 1.0 |
| WBAEQN1 | 0.0000 | 0.0000 | | 0.0000 | −6500.7 |
| WBAEQN2 | 0.0000 | 0.0000 | | 0.0000 | −6798.8 |
| WBAEQN3 | 0.0000 | 0.0000 | | 0.0000 | −6748.9 |
| CCAEQN4 | 0.0000 | 0.0000 | 0.0000 | 0.0000 | −1632.0 |
| CCAEQN5 | 0.0000 | 0.0000 | 0.0000 | 0.0000 | −1826.8 |
| CCAEQN6 | 0.0000 | 0.0000 | 0.0000 | 0.0000 | −1831.4 |
| CCAEQN7 | 0.0000 | 0.0000 | 0.0000 | 0.0000 | 0.0 |
| CCAEQN8 | 0.0000 | 0.0000 | 0.0000 | 0.0000 | −1792.0 |
| CCAEQN9 | 0.0000 | 0.0000 | 0.0000 | 0.0000 | 0.0 |
| CCAEQN10 | 0.0000 | 0.0000 | 0.0000 | 0.0000 | −1719.4 |
| NCTEQN11 | 0.0000 | 0.0000 | | 0.0000 | −168.1 |
| XCLEQN12 | 0.0000 | 0.0000 | 0.0000 | | 0.0 |
| XSPEQN13 | 0.0000 | 0.0000 | 0.0000 | | 0.0 |
| NSPEQN14 | 0.0000 | 0.0000 | | 0.0000 | 0.0 |
| XSUEQN15 | 0.0000 | 0.0000 | 0.0000 | | 0.0 |

| Variable | ACTIVITY | COST | LO BND | HI BND | DJ VALUE |
|---|---|---|---|---|---|
| PURVAR1 | 0.0000 | −450.0000 | 0.0000 | 0.0000 | 2464.2 |
| PURVAR2 | 0.0000 | −763.7790 | 0.0000 | 0.0000 | −52.2 |
| PURVAR3 | 0.0000 | −450.0000 | 0.0000 | 0.0000 | 2712.4 |
| SELVAR4 | 0.0000 | 603.5080 | 0.0000 | 0.0000 | 5413.4 |
| SELVAR5 | 0.0000 | 603.5080 | 0.0000 | 0.0000 | 5413.4 |
| SELVAR6 | 0.0000 | 603.5080 | 0.0000 | 0.0000 | 5413.4 |
| BLRVAR7 | 0.0000 | 0.0000 | 0.0000 | | −249.1 |
| BSRVAR8 | 0.0000 | 0.0000 | 0.0000 | | −25.5 |
| BSRVAR9 | 0.0000 | 0.0000 | 0.0000 | | 0.0 |
| BG5VAR10 | 3.2449 | 0.0000 | 0.0000 | | 0.0 |
| BG5VAR11 | 0.0000 | 0.0000 | 0.0000 | | −319.4 |
| SCRVAR12 | 0.0000 | 0.0000 | 0.0000 | | −13523.1 |

In general, Operating Plans contain primal information referring to the activity of process variables related to commercial decisions, logistic movements, operating parameters, market conditions, compositional, physical and/or chemical characteristics of the streams and materials in an operating facility, operating unit utilization, and finished product specs. Operating Plans also contain dual information referring to the marginal values of operating constrains, process limits, unit capacities, mass balances for materials and streams in the operating facilities, product specifications, process variable bounds and the like.

B. Statistical Analysis of Operating Plan Data

This disclosed methods and systems leverage statistical modeling techniques from which the following information can be derived: (1) A measure of how important each process variable is to the describing the variability of the data set; and (2) A measure of correlation among the process variables in the dataset. One such technique is Principal Component Analysis (PCA), for example, the Loadings Matrix that is generated as part of the projection of the original data onto the space of the latent variables (or principal components).

The contribution of a process variable to each of the principal components, reflected in the corresponding loadings value, can be used to determine a variable importance. The disclosed methods and systems can include a step to prune variables based on either an aggregated measure of variable importance, or the construction of hypervolume around the origin in the loadings space.

FIG. 3 illustrates a two-dimensional view of an example loadings matrix. In FIG. 3, each dot is a process variable with a value for component 1 (x-axis) and for component 2 (y-axis). The magnitudes of each of those values represents the contribution of that variable to each principal component. One technological component of the disclosed methods and systems involves calculating a hyper-volume (a rectangle in two dimensions) that encloses variables around the origin that, by definition, do not have a large contribution to the behavior of the data; i.e., they can be deleted from the dataset without major changes in the behavior of the data. The same component can use other definitions of variable importance such as "variable VIP value" to filter variables with smaller contribution to the behavior of the data set. This step is identified as "Variable Pruning."

After Variable Pruning, another component of the disclosed methods and systems identifies groups of variables that are linearly correlated. This component can use clustering technology to group variables in the loadings. In FIG. 3, this would mean grouping dots according to their position in the two-dimensional plot. The closer two variables are in the loadings space, the more linearly correlated they are.

C. Feature Selection

Figure 4:
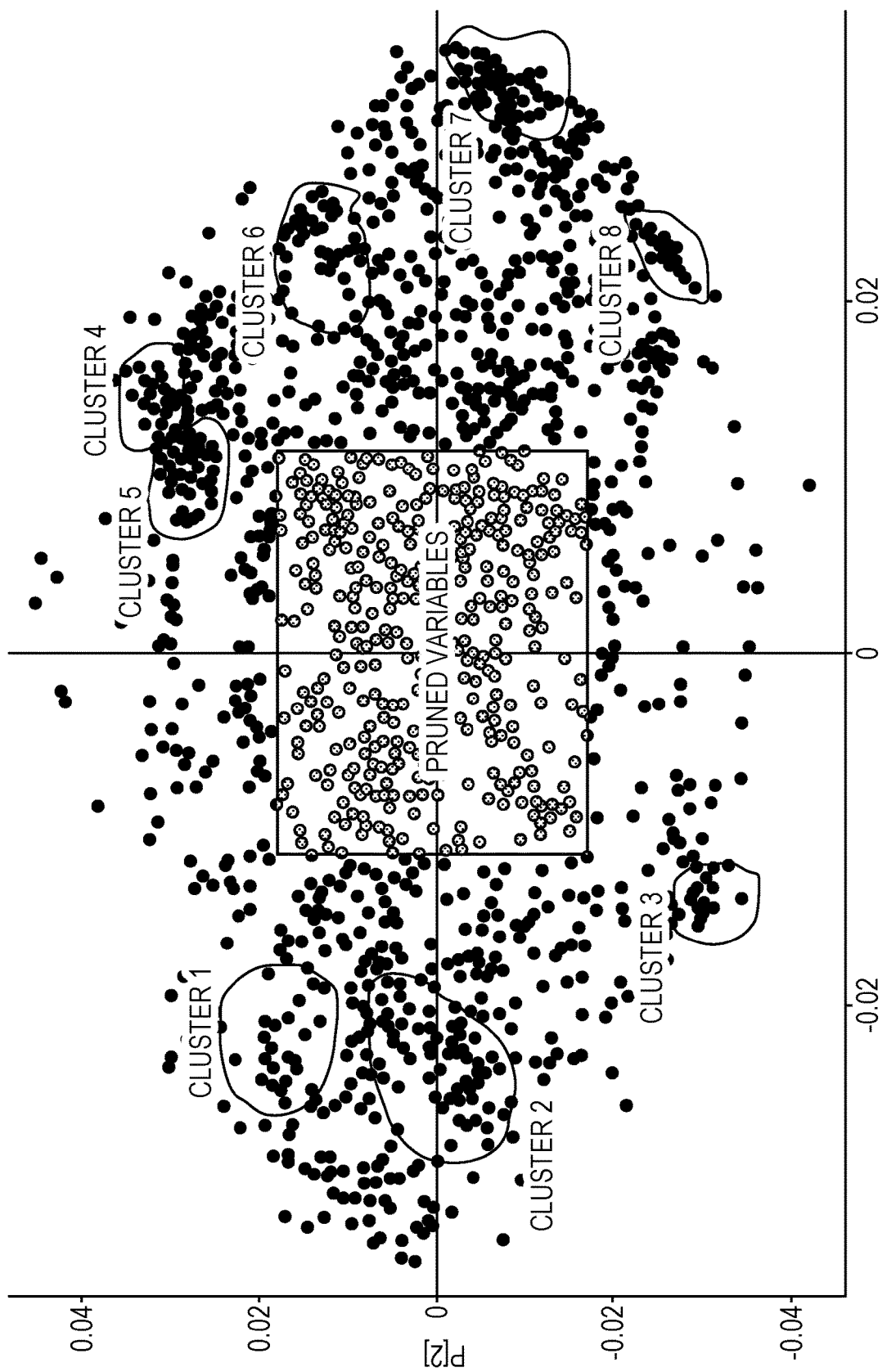
FIG. 4 illustrates a two-dimensional view of an example loadings matrix with clusters for a hypothetical system with two principal components.

This disclosed methods and systems provides for selection of a set of process variables with minimal co-linearity that are statistically significant in explaining the variability across operational plans. The input for this feature selection is a set of process variable clusters. As per the previous step, the process variables are clustered in the space of PCA Loadings after a Variable Pruning step. FIG. 4 illustrates these clusters for a hypothetical system with two principal components (two-dimensional loadings matrix). In FIG. 4, not all process variables belong to a cluster, however, any clustering algorithm can be used, some of which force all process variables to be part of one of the clusters.

Example steps of Feature Selection technology are: (1) Postulate a desired number of key features to be selected from the process variables; (2) Calculate how many process variables to select from each cluster to match as closely as possible the desired number of variables; the desired number of variables and the actual number of variables may vary since there a minimum number of features to be selected from each cluster; (3) Decide which variables to pick from each cluster.

A desired number of key features in Step 1 (postulating desired number of key features) can be provided as an input by the user. The number of key features should be between 1% and 10% of the total number of process variables. If no input is provided, a default depending on the total number of process variables can be used.

Step 2 (calculating how many variables are extracted from each cluster) can be performed in one of three ways: (a) As a function of the relative hyper-volume of each cluster; (b) As a function of the relative number of variables in each cluster; or (c) Uniformly across all clusters. In (a), the total number of variables desired from Step 1 can be distributed proportionally to the hyper-volume of the cluster in the space of the Loadings. In FIG. 4, the greatest portion of variables would be extracted by Cluster 4 since it has the largest area. A minimum of one key feature needs to be extracted from each cluster regardless of its hyper-volume. In (a), the total number of variables desired from Step 1 can be distributed proportionally to the number of features in each cluster. In FIG. 4, Cluster 7 would be assigned more variables than Cluster 1—even though they have roughly the same area—because Cluster 7 has many more variables. A minimum of one key feature needs to be extracted from each cluster regardless of how many variables are in the cluster. In (c), the Clusters are ordered in an arbitrary way and a feature is extracted from each cluster following that order. When the end of the ordering is reached, a key feature is again extracted from the first cluster and so on, until the desired number of features is selected. At least one feature needs to be extracted from each cluster even if this exceeds the total number of desired variables.

Step 3 (Deciding which variables to pick from each cluster) can be performed in one of four ways: (a) Using a process variable priority scale based on user metadata; (b) Using a geometrical criterion that minimizes collinearity among the variables selected; (c) Using a measure of variable importance; and (4) Randomly. In (a), any kind of metadata that reflects subject matter expertise can be leveraged. For instance, this could be a relative ranking of different types of variables (unit capacity utilization, purchases, sales, process limits, etc.) since in most modeling systems each variable can be classified into a type. Another example of metadata would be a simple list of the 20, 50, or 100 variables from the model that are most important for the user. Then, those variables with higher priority rating are extracted first from a cluster. In (b), the first variable chosen from each cluster is the one with the largest loading value for the first principal component. The second variable is the one with the largest loading value for the second principal component, and so on. Once all components are visited, the next variable to be chosen is the one with the smallest loading value for the first principal component. Afterwards comes the variable with the smallest loading value for the second principal component and so on. The idea of this methodology is to choose variables that are at the edges of the cluster and as far away as possible, since those variables are the least correlated. In (c), any measure of variable importance can be used, such as, for example, "variable VIP value," mentioned above. In this scenario, the variables within each cluster are ordered based on their importance and then selected in that order until the required number of variables is reached. In (d), the variables are picked from each cluster in any order until the number of required variables is reached. Approaches a-d can be combined if necessary. For instance, in the case where there are not enough variables with a priority rating to complete the desired number of features.

D. Validation of Operating Plans

The subset of process variables (Key Features) obtained using the disclosed systems and methods is ideal for validating a proposed Operating Plan against historical Operating Plans.

Table 2 describes an example data set used for illustrating how a set of Key Features is used for validating an Operating Plan.

TABLE 2

| | |
|---|---|
| Description of historical data set | Operating Plans for a hypothetical refinery obtained using a common Planning Model in modelling system such as AspenTech PIMS. All Operating plans are from the same year and they consist of a combination of monthly and biweekly plans. |
| Total number of cases, variables | 23 Historical Cases<br>~6000 variables |
| Variables after preconditioning | ~2500 variables (other variables eliminated due to low variance across operating plans) |
| Desired and actual number of key features | 100 Desired key features<br>113 Actual key features (13 extra features required to appropriately represent the process variable clusters, as explained in Section C, Steps 1 and 2). |
| Types of variables in the set of Key Features | 12 Purchase variables<br>15 Sales variables<br>17 Unit Capacity Variables<br>25 Operational Process Variables<br>18 Constraint Marginal Values<br>26 Other types of variables |
| Description of Proposed Operating Plan | Variation of a Winter month Operating Plan where the price of the main winter grade fuel is increased by an order of magnitude. This type of change in price is usually the result of entering a wrong value in the model. |

In the example of Table 2, in order to validate the proposed Operating Plan, it was compared against the average of the 23 plans in the historical data set. In this illustrative example, the proposed Plan is a "pathological" variation of a valid plan (by entering a wrong price for a major fuel product). It was determined that the proposed case is so different from all the historical cases that there is not one subset of historical plans that is more relevant than any other for validating such plan.

This methods and systems disclosed herein use a methodology in the Principal Component domain for quantifying the statistical contribution to the difference between two operating plans (or sets of operating plans). This methodology involves calculating a Contribution to Scores for each variable. Table 3 shows the top 10 variables that contribute most to the difference between the Proposed Case and the average of the Historical Data Set in the illustrative example.

TABLE 3

| | Interpretation |
|---|---|
| Three Variables with largest positive delta between Proposed Case and Historical Data Set | |
| Crude Unit Operational Parameter 1 Routing of Intermediate Distillate Product Stream | The Crude Unit operation and routing of mid distillate streams are being optimized for the production of the winter product with (incorrectly) increased price |
| Marginal Value of Maximum Demand constraint for main fuel Product | The shadow price of maximum production of the (incorrectly) increased priced product is unusually large; this is typical indication of an unusual perturbation or user error |
| Two Variables with largest negative delta between Proposed Case and Historical Data Set | |
| Catalytic Cracker Capacity Utilization Naphtha Hydrotreater Capacity Utilization | The units that typically produce gasoline are minimally utilized as to maximize the yield of the of the winter product with (incorrectly) increased price |

The complete set of Key Features contains 113 variables. From Table 3, it can be can concluded that the selected subset of key features is enough to provide a qualitatively useful interpretation of the difference between a proposed plan and a set of historical data. In fact, only 5 out of the 113 Key Features was required to identify abnormalities in the proposed operating plan.

Example Digital Processing Environment

Figure 5:
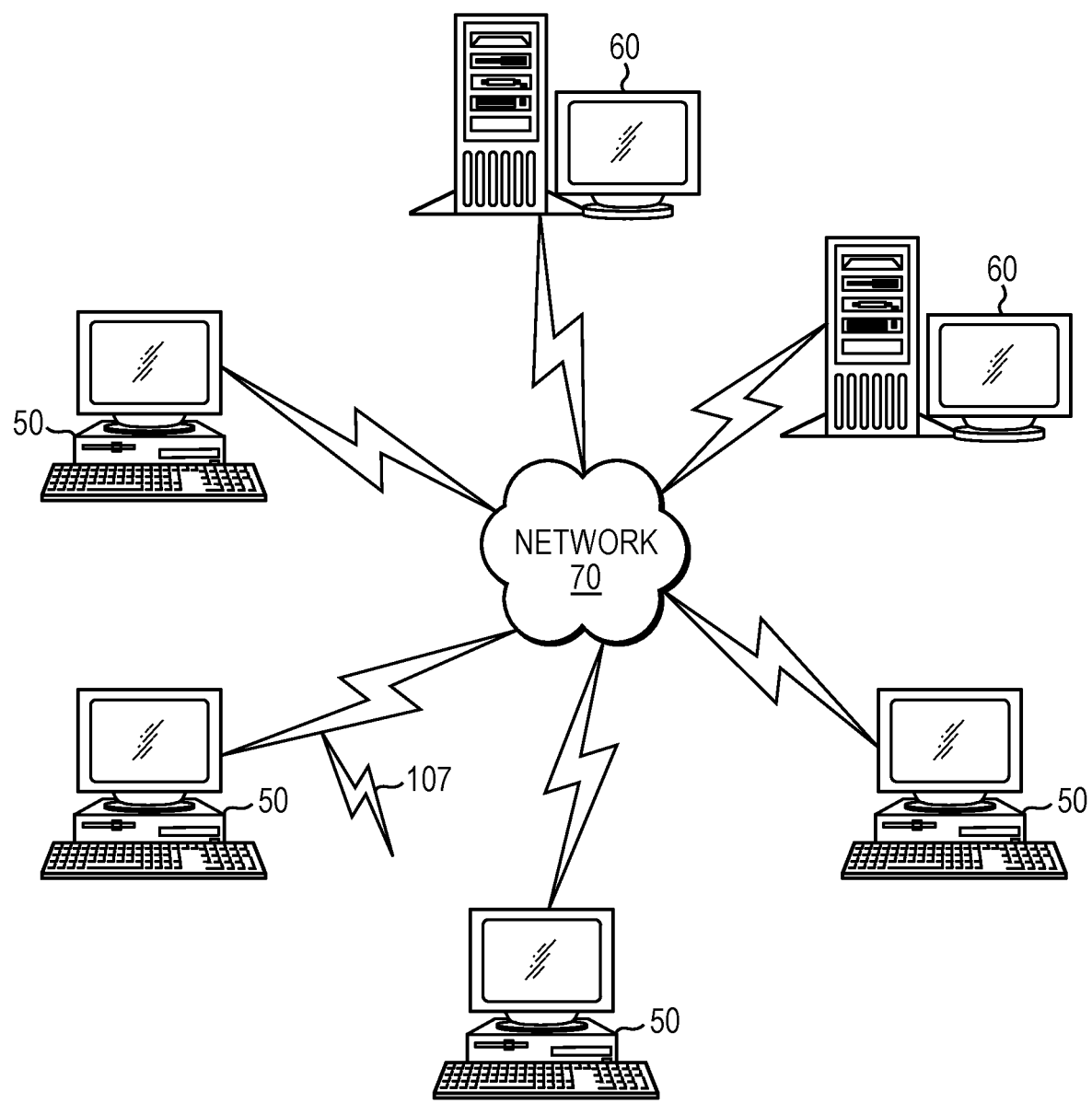
FIG. 5 is a schematic view of a computer network in which embodiments can be implemented.

FIG. 5 illustrates a computer network or similar digital processing environment in which the disclosed embodiments may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 6:
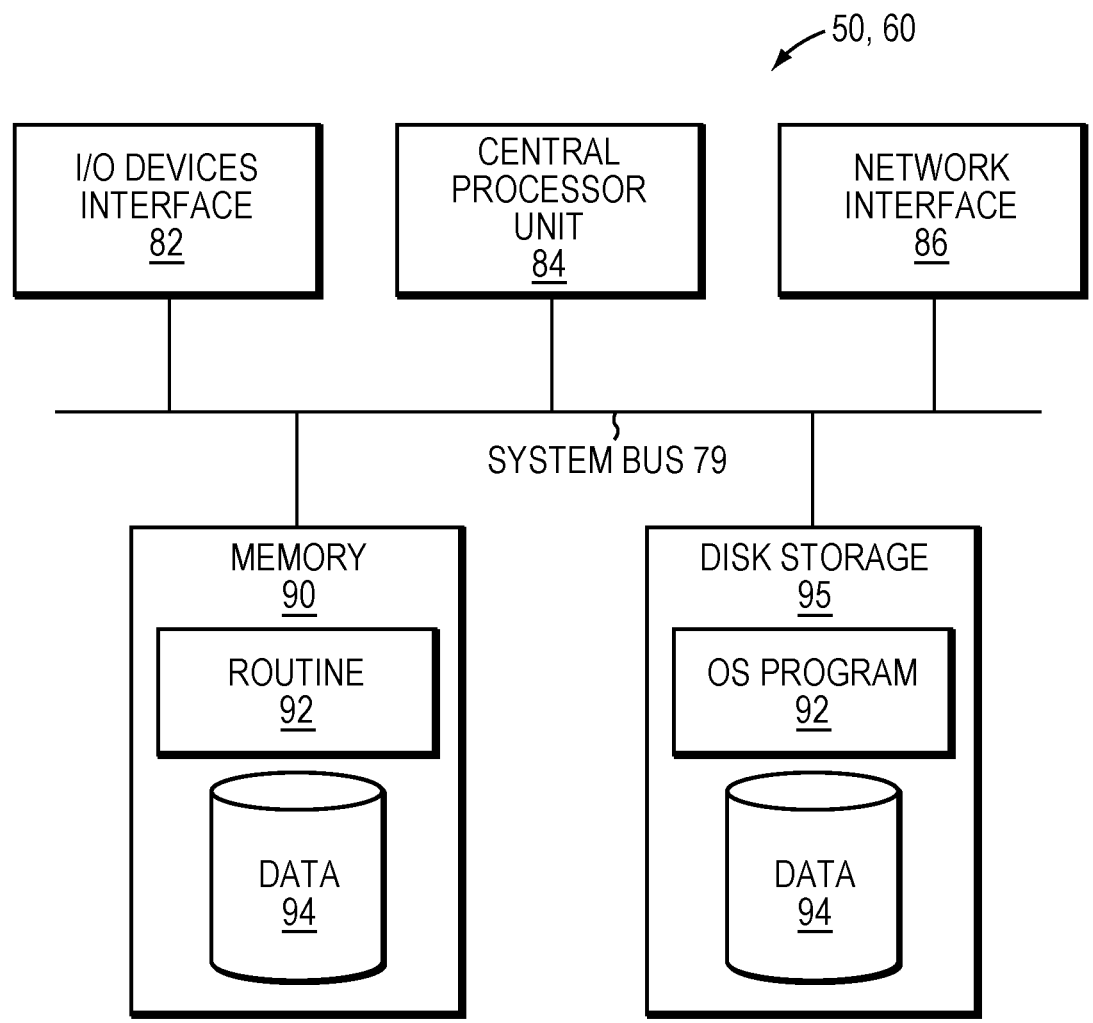
FIG. 6 is a block diagram of a computer node or device in the computer network of FIG. 5.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports) that enables the transfer of information between the elements. Attached to system bus 79 is I/O device interface 82 for connecting various input and output devices (e.g., keyboard, mouse, displays, printers, speakers) to the computer 50, 60.

Network interface 86 allows the computer to connect to various other devices attached to a network (e.g., network 70 of FIG. 5). Memory 90 provides volatile storage for computer software instructions 92 and data 94 used to implement an embodiment (method 100 of FIG. 1). Disk storage 95 provides non-volatile storage for computer software instructions 92 and data 94 used to implement an embodiment. Data 94 may include plant operating plans, plant scheduling plans, datasets of operating and/or scheduling plan data cases, PCA models, instructions for clustering techniques, hierarchical clustering structures, metadata structures, and so forth as previously discussed. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes) that provides at least a portion of the software instructions for the disclosed system. Computer program product 92 can be installed by any suitable software installation procedure, as is well known in the art. In another embodiment, at least a portion of the software instructions may also be downloaded over a cable, communication, and/or wireless connection. In other embodiments, the programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product. Generally speaking, the term "carrier medium" or transient carrier encompasses the foregoing transient signals, propagated signals, propagated medium, storage medium and the like. In other embodiments, the program product 92 may be implemented as a so-called Software as a Service (SaaS), or other installation or communication supporting end-users.

Example Advantages of the Disclosed Methods and Systems

Prior approaches to providing systematic methods for feature engineering are described in US20180137219 and US20180300637, which present recent disclosures that propose methods for systematic feature engineering.

An advantage of the methods and systems disclosed herein over US20180137219 is the economy and practicality of the algorithm for selecting critical features. In US20180137219, the frameworks for feature selection involve evolutionary feature selection, evolutionary feature synthesis and/or symbolic regression. These types of algorithms require significant computational effort in evaluating many subsets of features against a measure of fitness. The methods and systems disclosed herein only requires a one-time calculation of a latent variable model that uses a predefined universe of features (all process variables) and outputs a measure of importance and co-linearity.

An advantage of the methods and systems disclosed herein over US20180300637 is in the way that domain knowledge is incorporated into the feature selectin process. In US20180300637 it is claimed that prior art is improved by allowing the injection of domain knowledge into data-driven techniques for feature extraction, where domain knowledge is required to reduce possible features received from data. The methods and systems disclosed herein do not require domain knowledge to reduce features and select a vocabulary of critical variables. If domain knowledge is available, the methods and systems disclosed herein incorporate the domain knowledge as a guide for selecting features among a group of correlated process variables. Furthermore, in the methods and systems disclosed herein, domain knowledge does not reduce the possible features; rigorous statistical criteria of variable importance in describing data variability and variable co-linearity are used to reduce the features, and only then domain knowledge can be used if available to resolve a non-unique choice of critical variables.

Another prior approach is described in U.S. Pat. No. 8,046,318, which may be related to validating a new operating plan. An advantage over U.S. Pat. No. 8,046,318 is in the contents of the output provided by the methods and systems disclosed herein. In U.S. Pat. No. 8,046,318, a new operating plan would be represented as a vector of process variables. Then a set of similar vectors is identified from historical data and distance measure R is calculated from the new vector to the similar vectors and possibly a riskiness measure r. In the methods and systems disclosed herein, a delta is calculated between a proposed case (vector) and a historical set of cases in the Scores space of a PCA model constructed from operating plan data. An advantage is that the latent variables in the PCA model are calculated to capture the direction of maximum variability in the data.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer implemented method of industrial process control, comprising:
   receiving in computer memory a dataset including initial process parameters representing operational data of a subject industrial process;
   identifying a subset of the process parameters indicative of control data for controlling the subject industrial process, said identifying including:
   (i) filtering the initial process parameters as a function of relative importance among the initial process parameters in describing variability of the operational data, wherein the filtering as a function of relative importance among the initial process parameters in describing the variability includes filtering the initial process parameters based on both: (i) contribution of each initial process parameter to a behavior of the operational data and (ii) contribution of each initial process parameter to one or more principal components of the operational data, wherein filtering the initial process parameters based on contribution of each initial process parameter to the one or more principal components comprises projecting the initial process parameters onto a space of the one or more principal components, constructing a hypervolume around an origin of the space, and removing process parameters in the hypervolume, the filtering resulting in a filtered dataset having process parameters above a threshold of importance to the behavior of the operational data;
   (ii) grouping into one or more clusters the process parameters of the filtered dataset based on closeness of linear correlation among the process parameters of the filtered dataset, wherein each cluster includes grouped process parameters with close linear correlation; and
   (iii) for each cluster resulting from the grouping:
      determining a number of process parameters to extract from the cluster; and
      individually extracting process parameters, representative of the cluster, from the grouped process parameters of the cluster, based on the determined number of process parameters and any one or combination of (a) a priority rating, (b) a measure of collinearity between the grouped process parameters within each given cluster of the determined clusters, (c) a measure of importance associated with the grouped process parameters, and (d) randomly or pseudo-randomly, wherein the extracting stores a respective individual indication of each individual process parameter extracted individually from each cluster and the process parameters extracted are the identified subset of the process parameters; and
   automatically applying the identified subset of the process parameters controlling the subject industrial process.

2. The method of claim 1, wherein the industrial process includes at least one of an optimized operational planning process, a scheduling process, a simulated chemical plant process, and an actual chemical plant process.

3. The method of claim 1, wherein the operational data includes at least one of operating plan data and scheduling data.

4. The method of claim 1, wherein the initial process parameters include at least one of a primal variable and a dual variable.

5. The method of claim 1, wherein the initial process parameters include at least one of a process variable and a process constraint.

6. The method of claim 1, further comprising constructing a principal component analysis (PCA) model that reduces dimensionality of the operational data of the dataset.

7. The method of claim 1, wherein determining the number of process parameters to extract is based proportionally on at least one of (a) relative hyper-volumes of the clusters, (b) relative numbers of the grouped process parameters of the clusters, and (c) a uniform distribution between a plurality of the clusters.

8. The method of claim 1, wherein at least one of:
the priority rating is based on information indicative of subject matter expertise, the information comprising at least one of (a) metadata and (b) embedded information;
the priority rating is determined based on domain knowledge;
the measure of collinearity is a measure of linear correlation of the grouped process parameters within a projected space; and
the measure of linear correlation of the grouped process parameters within the projected space increases as proximity between the grouped process parameters increases, and the measure of collinearity decreases as the grouped process parameters approach one or more edges of a cluster of the one or more clusters.

9. A computer system for industrial process control, the system comprising:
a processor operatively coupled to a data storage system, the processor configured to:
receive in computer memory a dataset including initial process parameters representing operational data of a subject industrial process;
identify a subset of the process parameters indicative of control data for controlling the subject industrial process, said identifying including:
(i) filtering the initial process parameters as a function of relative importance among the initial process parameters in describing variability of the operational data, wherein the filtering as a function of relative importance among the initial process parameters in describing the variability includes filtering the initial process parameters based on both: (i) contribution of each initial process parameter to a behavior of the operational data and (ii) contribution of each initial process parameter to one or more principal components of the operational data, wherein filtering the initial process parameters based on contribution of each initial process parameter to the one or more principal components comprises projecting the initial process parameters onto a space of the one or more principal components, constructing a hypervolume around an origin of the space, and removing process parameters in the hypervolume, the filtering resulting in a filtered dataset having process parameters above a threshold of importance to the behavior of the operational data;

(ii) grouping into one or more clusters the process parameters of the filtered dataset based on closeness of linear correlation among the process parameters of the filtered dataset, wherein each cluster includes grouped process parameters with close linear correlation; and
(iii) for each cluster resulting from the grouping:
determining a number of process parameters to extract from the cluster; and
individually extracting process parameters, representative of the cluster, from the grouped process parameters of the cluster, based on the determined number of process parameters and any one or combination of (a) a priority rating, (b) a measure of collinearity between the grouped process parameters within each given cluster of the determined clusters, (c) a measure of importance associated with the grouped process parameters, and (d) randomly or pseudo-randomly, wherein the extracting stores a respective individual indication of each individual process parameter extracted individually from each cluster and the process parameters extracted are the identified subset of the process parameters; and
automatically apply the identified subset of the process parameters controlling the subject industrial process.

10. The computer system of claim 9, wherein the industrial process includes at least one of an optimized operational planning process, a scheduling process, a simulated chemical plant process, and an actual chemical plant process.

11. The computer system of claim 9, wherein the operational data includes at least one of operating plan data and scheduling data.

12. The computer system of claim 9, wherein the initial process parameters include at least one of a primal variable and a dual variable.

13. The computer system of claim 9, wherein the initial process parameters include at least one of a process variable and a process constraint.

14. The computer system of claim 9, wherein the processor is further configured to construct a principal component analysis (PCA) model that reduces dimensionality of the operational data of the dataset.

15. The computer system of claim 9, wherein the processor is further configured to determine the number of process parameters to extract based proportionally on at least one of (a) relative hyper-volumes of the clusters, (b) relative numbers of the grouped process parameters of the clusters, and (c) a uniform distribution between a plurality of the clusters.

16. The computer system of claim 9, wherein at least one of:
the priority rating is based on information indicative of subject matter expertise, the information comprising at least one of (a) metadata and (b) embedded information;
the priority rating is determined based on domain knowledge;
the measure of collinearity is a measure of linear correlation of the grouped process parameters within a projected space; and
the measure of linear correlation of the grouped process parameters within the projected space increases as proximity between the grouped process parameters increases, and the measure of collinearity decreases as the grouped process parameters approach one or more edges of a cluster of the one or more clusters.

17. A non-transitory computer-readable data storage medium comprising instructions causing a computer to:
receive in computer memory a dataset including initial process parameters representing operational data of a subject industrial process;
identify a subset of the process parameters indicative of control data for controlling the subject industrial process, said identifying including:
(i) filtering the initial process parameters as a function of relative importance among the initial process parameters in describing variability of the operational data, wherein the filtering as a function of relative importance among the initial process parameters in describing the variability includes filtering the initial process parameters based on both: (i) contribution of each initial process parameter to behavior of the operational data and (ii) contribution of each initial process parameter to one or more principal components of the operational data, wherein filtering the initial process parameters based on contribution of each initial process parameter to the one or more principal components comprises projecting the initial process parameters onto a space of the one or more principal components, constructing a hypervolume around an origin of the space, and removing process parameters in the hypervolume, the filtering resulting in a filtered dataset having process parameters above a threshold of importance to the behavior of the operational data;
(ii) grouping into one or more clusters the process parameters of the filtered dataset based on closeness of linear correlation among the process parameters of the filtered dataset, wherein each cluster includes grouped process parameters with close linear correlation; and
(iii) for each cluster resulting from the grouping:
determining a number of process parameters to extract from the cluster; and
individually extracting process parameters, representative of the cluster, from the grouped process parameters of the cluster, based on the determined number process parameters and any one or combination of (a) a priority rating, (b) a measure of collinearity between the grouped process parameters within each given cluster of the determined clusters, (c) a measure of importance associated with the grouped process parameters, and (d) randomly or pseudo-randomly, wherein the extracting stores a respective individual indication of each individual process parameter extracted individually from each cluster and the process parameters extracted are the identified subset of the process parameters; and
automatically apply the identified subset of the process parameters controlling the subject industrial process.

18. The non-transitory computer-readable data storage medium of claim 17 wherein the instructions cause the computer to:
(i) construct a principal component analysis (PCA) model that reduces dimensionality of the operational data of the dataset; and
(ii) determine the number of process parameters to extract based proportionally on at least one of (a) relative hyper-volumes of the clusters, (b) relative numbers of the grouped process parameters of the clusters, and (c) a uniform distribution between a plurality of the clusters.

* * * * *